United States Patent [19]
DeVault et al.

[11] Patent Number: 5,857,534
[45] Date of Patent: Jan. 12, 1999

[54] ROBOTIC INSPECTION APPARATUS AND METHOD

[75] Inventors: James E. DeVault, Wamego; William B. Hudson, Alma; Mustaque Hossain, Manhattan, all of Kans.

[73] Assignee: Kansas State University Research Foundation, Manhattan, Kans.

[21] Appl. No.: 869,497

[22] Filed: Jun. 5, 1997

[51] Int. Cl.$^6$ ....................................................... B25J 11/00
[52] U.S. Cl. ................................. 180/21; 180/22; 901/1; 901/44; 73/786
[58] Field of Search .......................... 180/21, 22; 901/1, 901/44; 405/154, 190; 15/104.04; 114/330, 222; 73/786

[56] References Cited

U.S. PATENT DOCUMENTS

| | | |
|---|---|---|
| 4,556,124 | 12/1985 | Lotto . |
| 4,690,247 | 9/1987 | Yoshida . |
| 4,696,371 | 9/1987 | Moong . |
| 4,721,055 | 1/1988 | Pado ......................................... 114/331 |
| 4,789,947 | 12/1988 | Maciejczak . |
| 4,795,957 | 1/1989 | MacNeal, Jr. et al. . |
| 4,871,036 | 10/1989 | Parrott ...................................... 173/163 |
| 5,099,692 | 3/1992 | Lodder et al. . |
| 5,203,646 | 4/1993 | Landsberger et al. . |
| 5,429,009 | 7/1995 | Wolfe et al. . |
| 5,435,405 | 7/1995 | Schempg et al. ........................ 180/9.1 |
| 5,498,940 | 3/1996 | Kim et al. . |
| 5,562,064 | 10/1996 | Cunningham et al. .................. 114/229 |

*Primary Examiner*—Christopher P. Ellis
*Attorney, Agent, or Firm*—Hovey, Williams, Timmons & Collins

[57] ABSTRACT

A robotic assembly (20) is provided which is adapted to traverse the surface of a member (138) for inspection and/or work on or about the surface of the member (138). The preferred assembly (20) includes two or more robots (10a–10c) spaced about the body (138) with a tether assembly (140) interconnecting the robots (10a–10c) in order to hold the latter in tractive engagement with the surface of the body (138). Each of the robots (10a–10c) includes rotatable traction wheel assemblies (16) which are independently controllable through respective drive motors (86), as well as independently controllable takeup reels (98) for adjusting the tension of the tether assembly (140). Each robot (10a–10c) preferably includes an elongated body (12) having four corner-mounted wheel assemblies (16) pivotally secured thereto, and a carriage (14) pivotally coupled to the body for pivoting thereof independently of the wheel assemblies (16) and about an axis transverse to the wheel assembly pivot axes. An operating unit (18) such as an imaging device is carried by the carriage (14). A microprocessor-based control (22) allows precise, remote operation of the assembly (20).

26 Claims, 5 Drawing Sheets

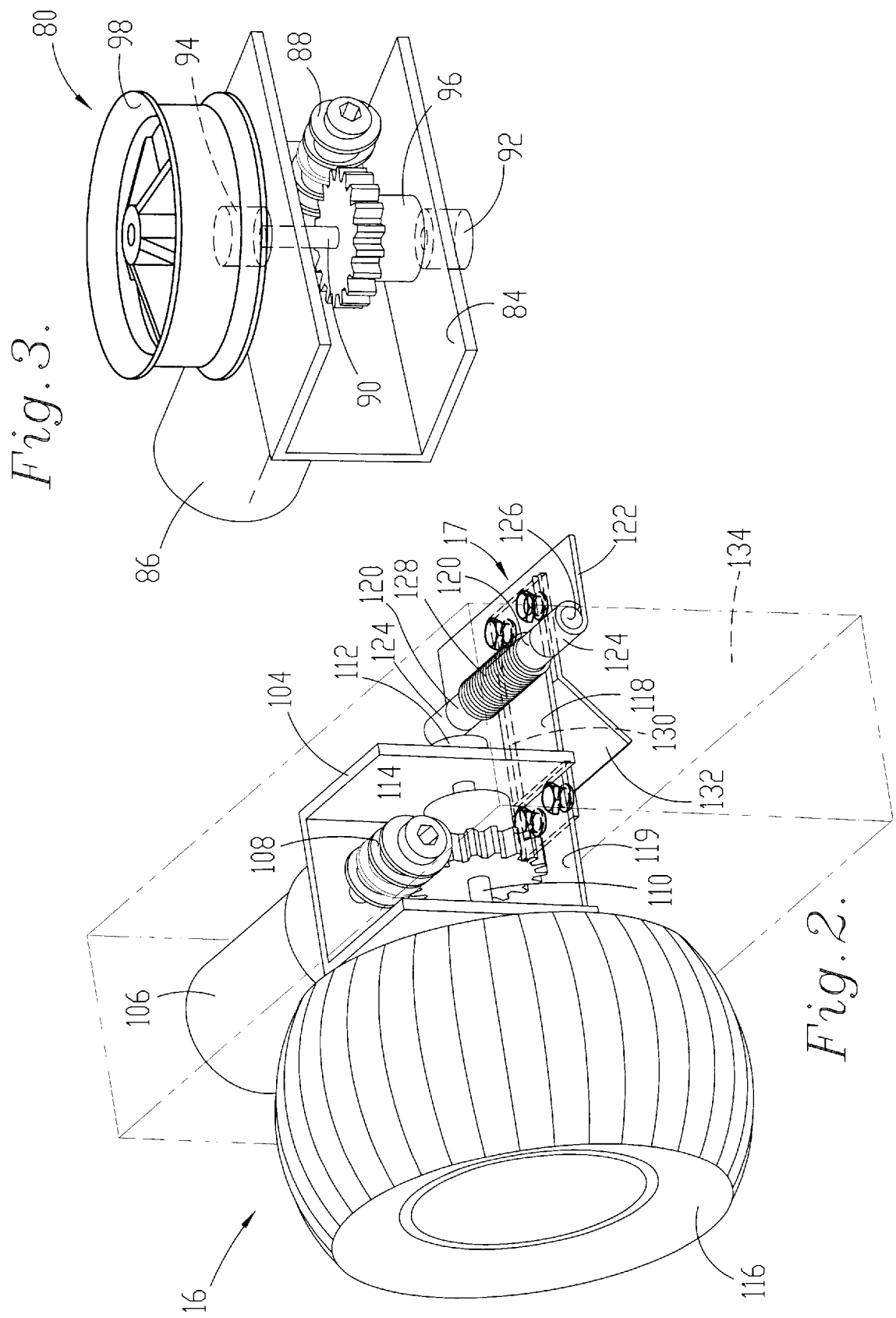

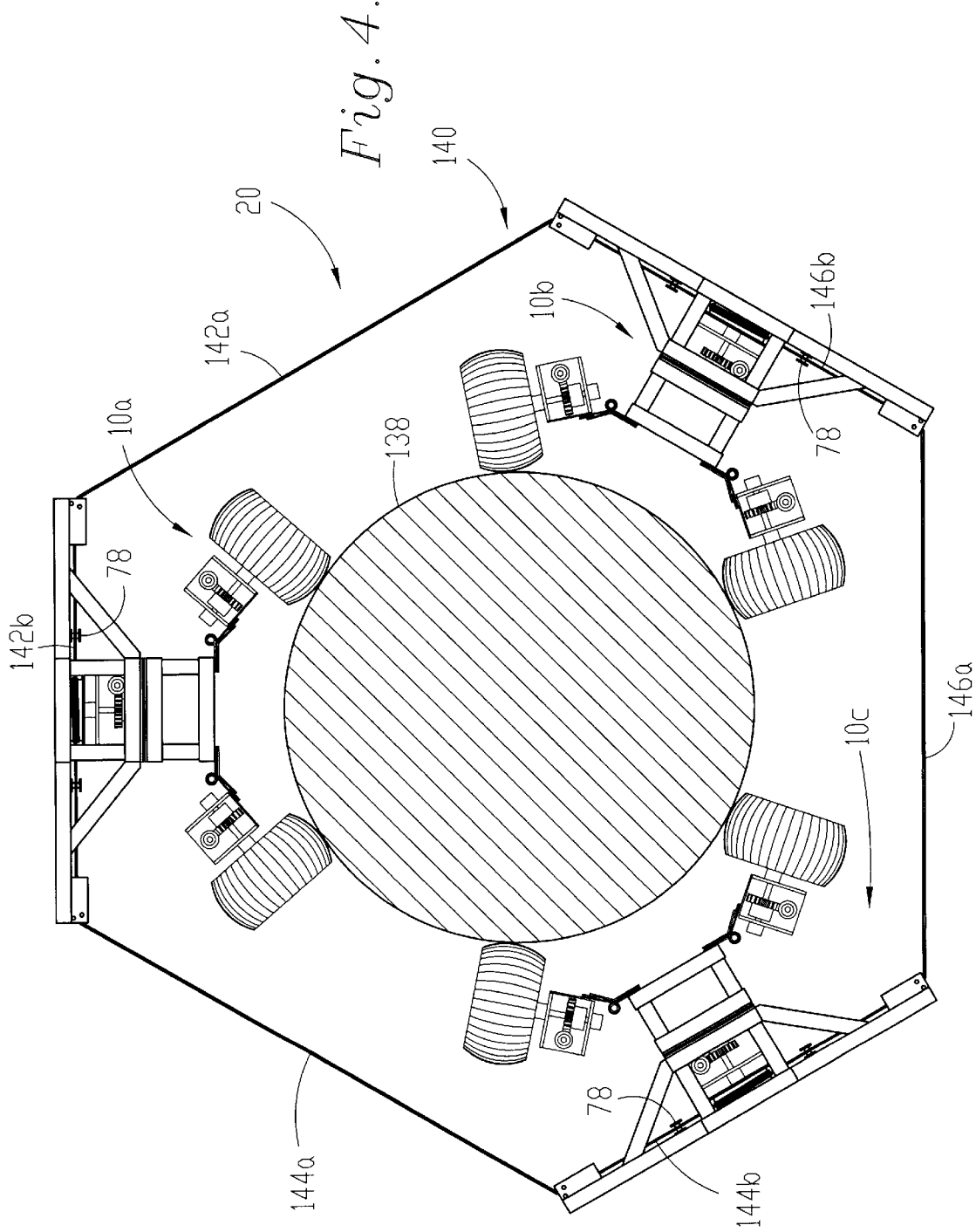

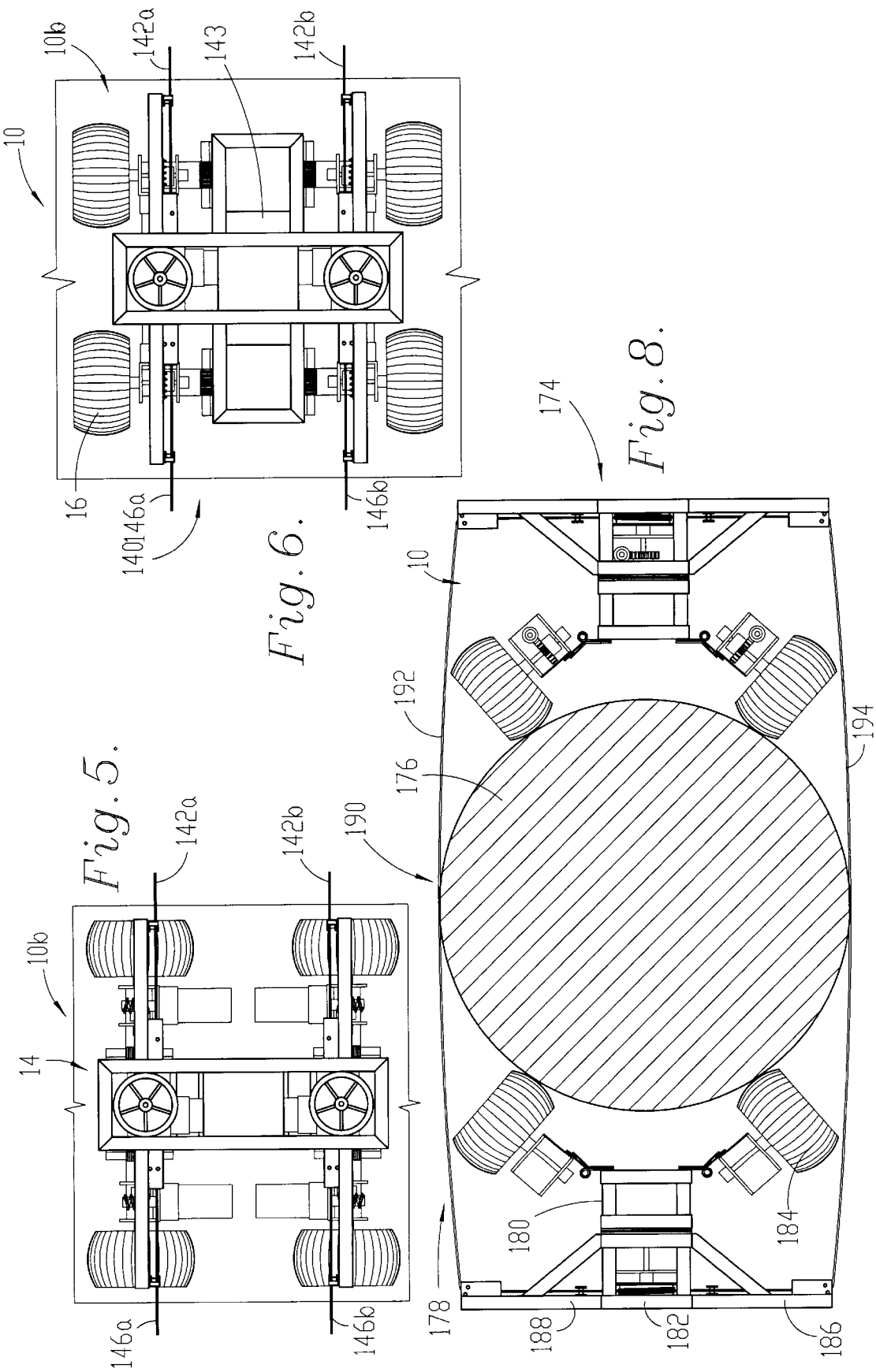

ROBOTIC INSPECTION APPARATUS AND METHOD

BACKGROUND OF THE INVENTION

1. Field of the Invention

The present invention is broadly concerned with improved mobile, remote controlled robots and robotic assemblies which can be used for the inspection of, or operations on or about, upright members such as bridge piers and abutments or generally horizontal or obliquely oriented members such as pipelines. More particularly, it is concerned with such mobile robots which have independently shiftable traction elements pivotally coupled to the robot body along with a carriage pivotally coupled to the body and adapted to support an operating unit such as a visual imaging device. In preferred forms, two or more such robots can be used in conjunction with a tether assembly operatively coupled to the respective robots and extending around the member to be inspected or otherwise worked upon. Control means is provided for selectively adjusting the tension of the tether assembly in order to hold the individual robots in tractive engagement with the member.

2. Description of the Prior Art

In order to maintain the safety of bridges, it is necessary to periodically inspect both the visible superstructure and underwater substructure of the bridges. It is obviously much more difficult to properly inspect the underwater portions of bridges and similar structures, owing to the harsh environment affecting the mobility and visibility of the inspectors. Generally speaking, underwater bridge inspections are presently carried out by divers, necessitating use of highly skilled inspectors knowledgeable of diving equipment, safety requirements, communication techniques and the inherent dangerous conditions of such inspections. Thus, the inspector must be capable of working under adverse water conditions such as deep, cold water and poor visibility (indeed under certain circumstances a diver/inspector can only use tactile methods of inspection) and have a comprehensive knowledge of the design and construction features of bridge substructures. A qualified inspector must also be able to properly interpret and report what is observed, be able to recognize structural deficiencies and to identify incipient problems so that preventive action can be taken.

In an effort to eliminate or minimize the need for diver/inspectors, sophisticated equipment such as echosounders, ultrasonic thickness gauges and remotely operated vehicles (ROV) have been used. ROVs have assumed an importance in the marine industry, and off-shore petroleum and salvage operations have increasingly relied upon information supplied by ROV cite investigations to aid in planning and execution of underwater tasks. Initially, ROV design tended to be generic, i.e., diverse applications were sought or a technology developed to provide general inspection and simple task performance capabilities. However, while prior ROVs have found utility in certain contexts, the inability of these fairly expensive systems to operate under strong currents in streams and rivers seriously limits their use for underwater inspection of bridges.

Surface inspection and/or work is also often required with horizontal or obliquely oriented bodies such as large pipelines. These pipelines extend for considerable distances through many types of terrains and conditions, and there is also a need for an improved system allowing remote control inspection or work upon these types of structures.

There is accordingly a need in the art for improved mobile robots and multiple-robot assemblies which can be used for the inspection of members or bodies such as bridge pillars, supports and pipelines, even under the sometimes extremely adverse conditions encountered in these environments.

SUMMARY OF THE INVENTION

The present invention overcomes the problems outlined above and provides improved mobile robots usable in combination to provide robotic inspection and/or work assemblies for use in environments heretofore unsuitable for such equipment. Broadly speaking, a robotic assembly in accordance with the invention is adapted to traverse a surface of a member (either underwater or open-air) and includes a mobile robot having a body equipped with spaced apart, shiftable traction elements for engaging the surface to be traversed and moving the body therealong, with at least certain of the traction elements being independently shiftable; the assembly further includes means for holding the mobile robot with said traction elements in engagement with the surface to be traversed, including an elongated tether assembly operably coupled with the robot body and extending about the member, together with means for selectively adjusting the tension of the tether assembly in order to hold the robot's traction elements in tractive engagement with the surface. The robot body is adapted to hold an operating unit for carrying out a desired operation on or adjacent the member, which may for example comprise a imaging device (e.g., a camera, X-ray device, ultrasound device or tactile imager). Preferably, a control assembly is operatively coupled with the tension-adjusting means and the traction elements of the robot so as to control the tension and shifting of these components; moreover, the control means advantageously operates the robot-mounted operating unit and also delivers power to the robot.

In preferred forms, the robot includes a carriage pivotally coupled to the main body of the robot, with the carriage supporting the desired operating unit and components of the tension-adjusting means. Two continuous treads can be used as the traction elements, or it may be preferred to employ four actuatable wheel assemblies coupled to the corners of the robot body. The preferred tether assembly is advantageously made up of a pair of spaced tethers each extending around the member with separate means for independently adjusting the tension of each tether.

In order to facilitate movement of a robot along a surface to be traversed, it is desirable to support the tether assembly in spaced relationship to the member being inspected or worked upon. If a single robot is used, a complete robotic assembly may advantageous employ a spaced, wheeled drone device or the like which will also support the tether assembly and be shiftable along the member surface (normally such a drone device would not include selectively shiftable traction elements but would simply be a follower robot). However, in particularly preferred forms, two or more individual mobile robots are employed to form the complete robotic assembly, with the robots being spaced about the member to be inspected or worked upon. The tether assembly extends between and interconnects the individual robots of the complete assembly. Preferably, each robot has a tension adjusting means in the form of a rotatable takeup reel with the tether assembly comprising (in the case of a two-robot design) first and second elongated flexible tether cables or strings each having a reel end and a coupling end. The first tether string is coupled to a first robot reel with the coupling therein secured to the body of the second robot; similarly, the second tether string is coupled with the second robot wheel with the coupling end thereof secured to the body of the first robot. In this way, a complete tether assembly, made up of the first and second tether strings is operatively connected to the two robots and extends around the member to be inspected and/or worked upon. Preferably, the tether strings are themselves spaced outwardly from the member.

During use of a robotic assembly made up of a single or multiple robots, the control means is coupled to the robot(s) so that the tensioning of the tether assembly may be controlled, along with rotation of the tractive elements of the robot(s) and the operation of the operating units carried thereby. The individual robot(s) of the assembly can climb or descend the surfaces of an upright member either vertically or obliquely according to the manner in which the tractive elements are controlled, and if desired can move in a circumscribing fashion about the member. Similarly, in the case of a horizontal or obliquely oriented member, the robot(s) may be controlled to traverse the entire member surface in any desired fashion.

BRIEF DESCRIPTION OF THE DRAWINGS

FIG. 2 is an enlarged perspective view of a preferred traction wheel assembly forming a part of the mobile robot of FIG. 1, with the water-tight encapsulating structure for the wheel assembly being depicted in phantom;

FIG. 3 is an enlarged perspective view of a powered tensioning takeup reel forming a part of the preferred mobile robot of the invention;

FIG. 4 is a top view illustrating a robotic assembly made up of three coupled together individual mobile robots in engagement with respective surface regions of an upright pillar and oriented for traversal of the upright surfaces thereof;

FIG. 5 is a plan view of a mobile robot in accordance with the invention shown during one mode of traversal of an upright surface region;

FIG. 6 is a plan view similar to that of FIG. 5, but showing the mode of traversal wherein the traction wheels are oriented transverse to those of FIG. 5;

FIG. 8 is a top view illustrating a robotic assembly made up of a mobile robot in conjunction with a drone device and tether assembly.

DETAILED DESCRIPTION OF THE PREFERRED EMBODIMENT

Figure 1:
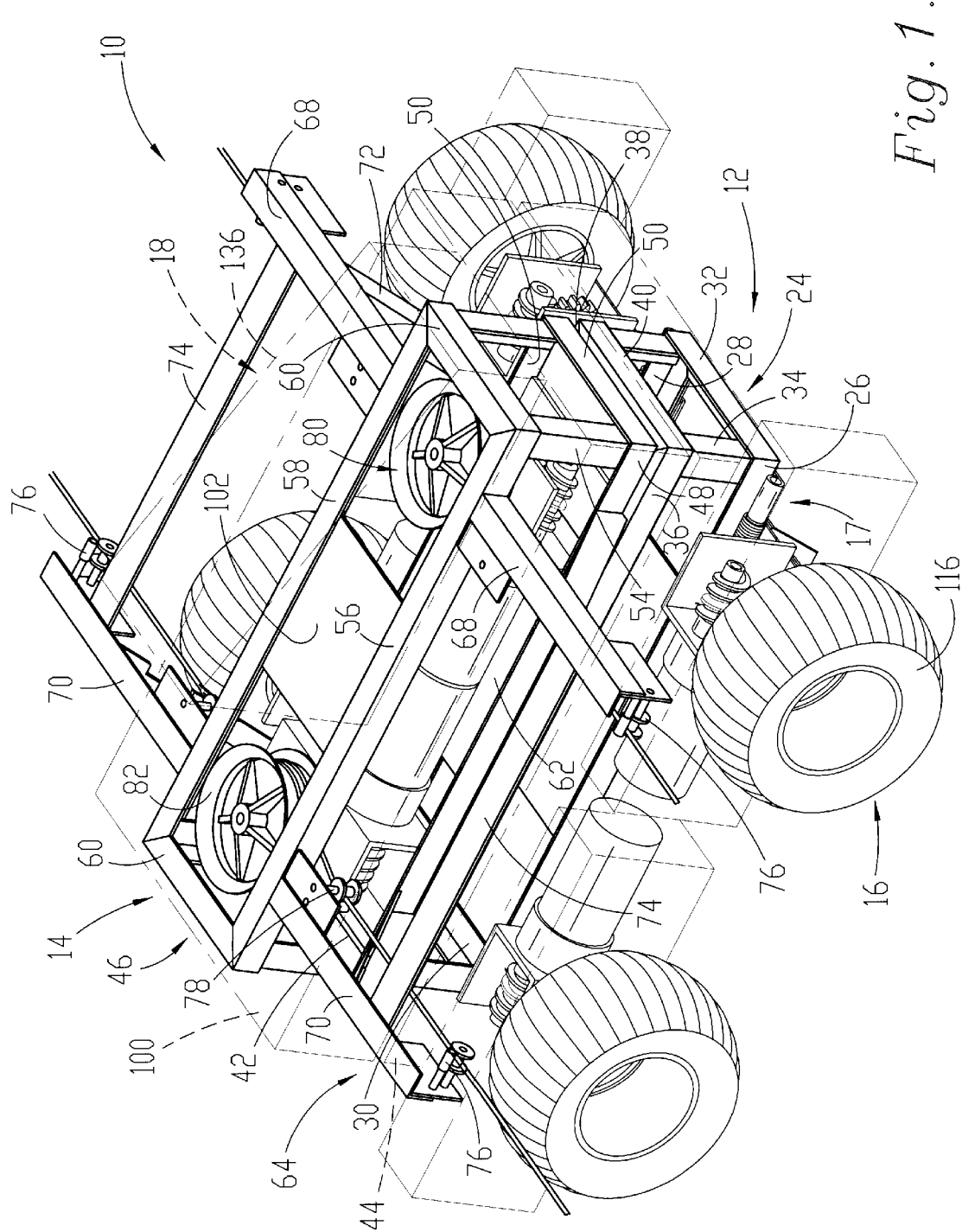
FIG. 1 is a perspective view of a preferred mobile robot in accordance with the invention, with water-tight encapsulating structure and an imaging operator unit being illustrated in phantom.
Figure 7:
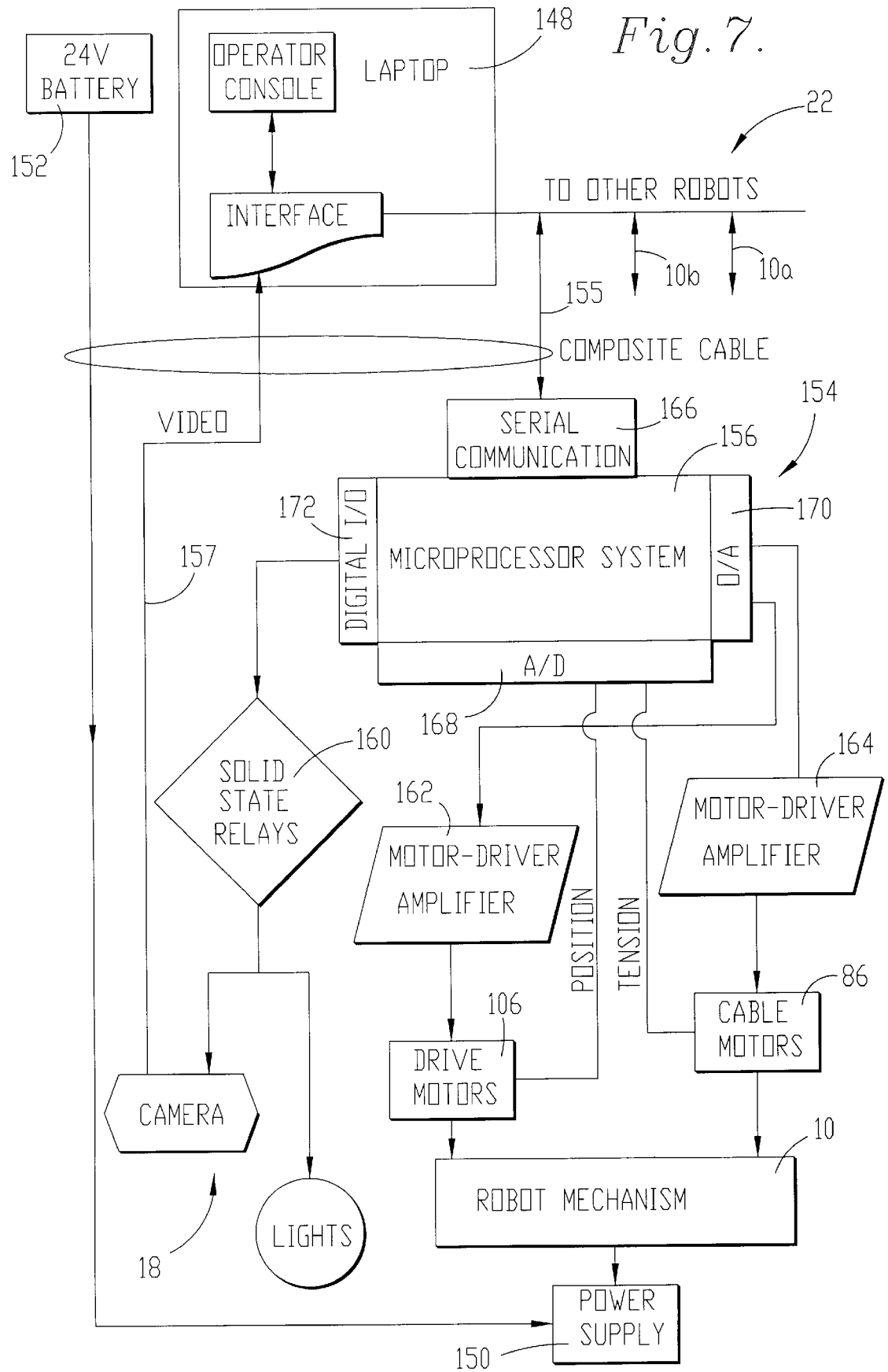
FIG. 7 is a block diagram illustrating the preferred microprocessor control means for the robotic assembly of the invention.

Turning now to the drawings and particularly FIG. 1, a mobile robot 10 is depicted. Broadly speaking, the presently preferred robot 10 includes a main body 12, a carriage 14 pivotally coupled to the body 12, and a total of four independently powered and actuatable wheel assemblies 16 pivotally coupled to body 12 via respective hinge devices 17. The carriage 14 is adapted to support a variety of operating units 18 (depicted in phantom in FIG. 1) such as a video camera or other imaging device. In preferred forms, an overall robotic assembly in accordance with the invention (FIG. 4) includes a plurality of spaced mobile robots 10 operatively coupled together through the use of a tether assembly 20 serving to draw the mobile units into engagement with surface regions of an upright body. The operation of the assembly 20 is preferably controlled by control means 22 (FIG. 7).

In more detail, the main body 12 of robot 10 is in the form of an elongated, rectangular in plan configuration box frame 24 comprising interconnected lower side rails 26, 28 and cross-rails 30, 32, upright corner struts 34, and interconnected upper frame side rails 36, 38, and cross-rails 40, 42. The box frame 24 is adapted to hold a number of the electronic components making up control means 22, as will be further described. In addition, the upper side rails 36, 38 support a pivot joint plate 43 (FIG. 6). The lower box frame 24 is designed for conventional water-tight encapsulation within a surrounding housing 44 as shown in FIG. 1, where underwater utility is pertinent.

The carriage 14 also includes a box-type frame 46 having lower side rails 48, 50, cross rails 52, upright struts 54, upper side rails 56, 58 and upper cross rails 60. A pivot joint plate 62 is secured to the underside of carriage 14 and is adapted for mating connection with plate 43. The plates 43, 60 carry conventional ball-bearing pivot structure (not shown) permitting full 360° rotation of carriage 14 relative to body 12.

The carriage 14 also supports a pair of laterally extending wing assemblies 64, 66. Each wing assembly includes laterally extending, fore and aft arms 68, 70 secured to a corresponding carriage side rail 56 or 58 and supported by means of oblique struts 72 extending from each arm downwardly to a corresponding lower side rail 48, 50. Further reinforcement is provided by a brace 74 extending between and connected to each adjacent pair of arms 60, 70 intermediate the ends thereof. Each of the arms 68, 70 further supports outboard and inboard, two-piece stationary tension string guides 76 and 78.

The carriage 14 supports a pair of identical, individually powered and controllable tension string takeup reel units 80, 82 located within the confines of box frame 46. Referring specifically to FIG. 3, it will be seen that each reel unit 80, 82 includes a channel support 84 adapted to be permanently attached to the lower side frames 48, 50. An electric motor 86 is secured to the bight of channel 84 and has a worm gear output shaft 88 which extends through the channel bight as shown. An upright shaft 90 extends between the legs of channel 84 and is supported for rotation via bearings 92, 94. A spur gear 96 is secured to shaft 90 and is in mesh with the worm 88. A rotatable reel 98 is positioned atop the channel 84 and is rotationally coupled with the shaft 92. It will thus be appreciated that appropriate actuation of motor 86 serves to rotate reel 98 in either a clockwise or counterclockwise direction as required.

The carriage box frame 46 is likewise encapsulated within a conventional water-tight housing 100 (FIG. 1) for underwater applications, the latter having suitable apertures for passage and movement of tension strings therethrough as will be explained below. In preferred forms, the box frame 46 also supports a battery pack (not shown), as well as a circuit board 102 forming a part of control means 22.

The four wheel assemblies 16 are identical and are each pivotally connected to an end of each lower body side frame rail 26, 28. An exemplary assembly 16 is illustrated in detail in FIG. 2 and includes a central, upright, metallic channel support 104. A selectively and independently operated electric motor 106 is secured to the bight of channel 104 and has a worm gear output shaft 108 extending through the bight. A transverse shaft 110 extends between the legs of support 104 and is rotationally supported via bearings 112. A spur gear 114 to shaft 110 and is in mesh with worm 108. The shaft 110 extends through the outboard leg of support 104 and is operatively coupled with a pneumatic traction tire 116. It will thus be appreciated that activation of motor 106 serves to selectively and independently rotate each of the traction tires 116 in either a forward or rearward direction as desired. Alternately, it may be sufficient to independently control only the pairs of wheel assemblies on each side of the box frame 24.

An L-bracket 118 is affixed to the inner face of the inboard leg of channel 104 and is secured to a bifurcated lower plate 119, the latter including a pair of innermost, circular, pin-receiving eyes 120 forming a part of hinge device 17. The remainder of the device 17 includes a main hinge plate 122 affixed to the underside of box frame 24 and having a pair of outboard barrel sections 124. The barrel sections 124 are in alignment with the eyes 120 and a hinge pin 126 extends through these elements to provide a complete hinge device. A coil spring 128 is disposed about the hinge pin 126 intermediate its ends and has a pair of outwardly extending operating legs 130 coupled to the underside of lower plate 119. An annular, synthetic resin segment (not shown) is likewise disposed about pin 126 within the confines of spring 128.

As will be appreciated from the foregoing description, each wheel assembly 16 is pivotal about the axis defined by its associated hinge pin 126, and the latter are parallel to each other. Each wheel 116 is pivotal through an arc limited at its upper end by interference between the wheel 116 and the carriage 114 and at its lower end by an oblique stop plate 132. The latter is secured to the underside of box frame 24 and presents an outwardly and downwardly oblique surface engaged by lower plate 119 at the downward limit of pivoting of the wheel assembly 16.

Each wheel assembly 16 has the motor and drive assembly thereof encapsulated within a water-tight housing 134 where underwater applications are desired, which of course affords the necessary opening for shaft 110 so as to allow driving rotation of the latter.

Again referring to FIG. 1, it will be observed that the operating unit 18 is conveniently positioned atop carriage box frame 46. This operating unit may be in the form of a video camera or other imaging device, or any other operating device which the user may elect to carry on mobile robot 10. The unit 18 would be housed in a conventional water-tight enclosure 136, where underwater applications are intended.

As explained previously, a preferred robotic assembly 20 in accordance with the invention is made up of at least two mobile robot units 10. As best seen in FIG. 4, three such mobile units 10a, 10b and 10c make up the overall assembly 20. In this exemplary illustration, the assembly 20 is used for inspection of upright surfaces of a pillar 138. The complete assembly 20 includes a tether assembly 140 serving to draw and hold the robots 10a–10c in tractive engagement with the surfaces of pillar 138, so as to allow traversal of the surfaces for inspection or other operations. The tether assembly 140 in this embodiment comprises two sets of three elongated tether strings per set, namely strings 142a, 144a, and 146a making up one set, and strings 142b, 144b and 146b making up the other set. Each of the strings 142a–146a and 142b–146b includes a reel end and a coupling end. Thus, the reel end of each of the strings is wound about an appropriate takeup reel 98 on one of the mobile robots 10a–10c, and extends to the next adjacent robot where it is coupled (i.e., dead-ended) to an inner string guide 78. It will thus be appreciated that the three tether strings making up each set thereof cooperatively define a continuous tether between the three mobile robots. It will further be appreciated that selective operation of the takeup reels 98 associated with each three string tether set can selectively adjust the tension exerted by that tether set.

The control means 22 schematically depicted in FIG. 7 is operable for continuously controlling the tension in tether assembly 140 via the independently actuatable reel motors 86 of each robot 10a–10c so as to hold the respective robots in tractive engagement with the upright surfaces of pillar 138; to control the independent shifting movement of the wheel assembly 16, again via the independently actuatable motors 106 thereof; to control the operation of operating unit 18; and to provide motive power to the respective robots. These control operations are carried out so that the assembly 20 may move upwardly, downwardly and laterally as desired so as to cover all surfaces of the pillar 138 requiring inspection or other operations thereon. To give but one example of the flexibility of this control, attention is directed to FIGS. 5–6. In FIG. 5, the traction wheel assemblies 16 of the robot 10b are shown in an essentially vertical orientation so that the robot 10b would be vertically climbing the pillar 138. In FIG. 6, the wheels are shown in a transverse orientation relative to that of FIG. 5, which could be accomplished by stopping or reversing the rotation of the left-hand wheels of the robot as shown in FIG. 5 and forwardly rotating the right-hand wheels thereof. At the same time, owing to the pivotal connection between the robot body 12 and the carriage 14, the latter remains in an essentially unchanged position. Accordingly, it will be readily seen that by appropriate control by the tension exerted by tether assembly 140 and simultaneous control of the rotation of the wheel assemblies 16, the entire surface of the pillar 128 can be readily traversed. It will also be understood that this same control means permits traversal of irregular or non-uniform surfaces.

Referring to FIG. 7, the preferred control means 22 broadly includes an operator's console 148 for receiving operational commands from an operator of the robot 10, a power supply 150 such as a battery pack coupled with a suitable source of power 152 such as 24-volt DC battery for powering the components of the robot 10, and on-board electronics, generally referred to by the numeral 154, positioned on each robot for receiving the operational commands from the operator's console and controlling the operation of the robot 10 in response thereto.

The operator's console 154, which is electrically coupled with the on-board electronics 154 by a serial data link 155, preferably consists of a laptop computer and an interface for providing port expansion and connectors. The laptop computer includes a graphical user interface for providing the operator with status information and control options. The graphic user interface is preferably written in Visual Basic or LabView and is compiled into executable-only machine code. The operator's console 154 is also coupled with the operating unit 18 by a cable 157 for receiving signals therefrom.

The on-board electronics 154 for each robot includes a microprocessor 156, solid state relays 160 positioned between the microprocessor and the operating unit 18 for activating and deactivating the operating unit, drive motor amplifiers 162 positioned between the microprocessor and the wheel motors 106 for activating the wheel motors, and cable motor amplifiers 164 positioned between the microprocessor and the cable tensioning motors 86 for activating the cable motors.

The microprocessor 156, which is preferably a Motorola device, has a communication port 166 coupled with the output of the operator's console 148 by the data link 155 for receiving serial commands from the operator's console. The microprocessor also includes analog-to-digital converters 168 for converting analog position and tension signals received from the cable motors 86 and driver motors 106, digital-to-analog converters 170 for driving the amplifiers 162,164, and digital outputs lines 172 for driving the relays 160. The microprocessor is programmed to receive operating commands from the operator's console, control the operation of the cable and driver motors 86, 106 and operating unit 18 in response thereto, and communicate with the microprocessors on the other robots 10b–10c when more than one robot is used.

To control the operation of the robot 10 or robots 10a–10c, an operator enters commands into the operator's console 148 to move the drive wheels, tension or untension the tensioning cable, or activate the operating unit 18. These commands are transmitted to the microprocessor over the serial data link 155, and the microprocessor generates control signals to activate the relays 160 and amplifiers 162,164, which in turn activate the appropriate components of the robot 10. At the same time, the operating unit 18 may provide positional data and sensor information (for example video images) to the operator's console so that the operator can control the movement of the robot 10 while viewing its actual position.

When more than one robot is used, the microprocessors of the robots 10a–10c communicate with one another indirectly using the operator's console as a central node. The control program resident in each microprocessor coordinates the motion of the robots and the tension on the tensioning cables. The cable tension can be sensed by the operator by momentarily pulsing the cable motors 86 and measuring the motor current. For example, when the motor current is high, the cables are relatively highly tensioned. Alternately, the on-board electronics 154 of each robot 10 may be provided with electromechanical transducers for sensing the actual position of the robot wheels and cable tensioners.

A second preferred embodiment of the invention is illustrated in FIG. 8. In this configuration, the assembly 174 is adapted to traverse the surfaces of an upright pillar or pier 176. The assembly 174 includes a robot 10 of the type illustrated in FIG. 1 and fully described previously. However, in lieu of a powered robot in opposition to the robot 10, a drone device 178 is employed. The latter includes a lower box frame 180, an upper box frame 182 pivotally coupled to the frame 180, and a series of four corner-mounted, pivotal wheel assemblies 184. The box frame 182 carries a pair of wing units 186, 188 extending laterally on the upper margin thereof as shown. It will be appreciated, however, that the drone unit 178 is not equipped with power assemblies for the wheel units 184 (although such could be provided if desired), nor does it include motor(s) for tether takeup.

The assembly 174 is completed by provision of a two-piece tether assembly 190 serving to hold the robot 10 and drone device 178 in tractive engagement with the pillar 176. In particular, two tether strings 192, 194 are coupled to the takeup reels associated with robot 10, and are operatively coupled in the manner previously described to drone device 178.

It will be appreciated from the foregoing that robot 10 can be controlled via control means 22 or similar structure, whereas the drone device 178 is merely a follower for the robot 10. However, such a simplified construction is lower in cost than use of plural, separately powered and controlled robots.

We claim:

1. A robotic assembly adapted to traverse a surface of a member and comprising:

a mobile robot including a body equipped with spaced apart, shiftable traction elements for engaging said surface and moving said body therealong, and means for independent shifting movement of at least certain of the traction elements respectively; and means for holding said mobile robot with said elements in tractive engagement with said surface, including an elongated tether assembly operatively coupled with said body and extending about said member, and means for selectively adjusting the tension of said tether assembly in order to hold said traction elements against said surface.

2. The robotic assembly of claim 1, including a control assembly operatively coupled with said tension-adjusting means for controlling the tension of said tether assembly.

3. The robotic assembly of claim 2, said control assembly including means for controlling and independently shifting each of said traction elements.

4. The robotic assembly of claim 1, said assembly supporting an operating unit for carrying out a desired operation on or adjacent said member.

5. The robotic assembly of claim 4, said operating unit comprising an imaging device, said control assembly including structure for receiving imaging signals from said device.

6. The robotic assembly of claim 4, said control assembly including structure for delivery of operating power to said movement shifting means, said tension adjusting means and said operating unit.

7. The robotic assembly of claim 1, said traction elements comprising rotatable wheels, there being a separate drive motor operatively coupled to at least certain of said wheels.

8. The robotic assembly of claim 1, including a carriage pivotally coupled to said body, said carriage supporting said tension-adjusting means.

9. The robotic assembly of claim 1, there being a pair of spaced apart separate tether assemblies, and a corresponding tension adjusting means for each tether assembly and separately operable motive means coupled to each tension adjusting means respectively.

10. The robotic assembly of claim 1, including at least two mobile robots each adapted to engage an opposed surface of said member, said tether assembly extending between and interconnecting said mobile robots.

11. The robotic assembly of claim 1, including a drone device adapted to engage a surface of said member, said tether assembly operably holding said mobile robot and drone device in said tractive engagement.

12. The robotic assembly of claim 10, including first and second mobile robots each adapted to engage an opposed surface of said member, said tension adjusting means of each of said robots comprising a rotatable takeup reel supported by the robot body, said tether assembly comprising first and second elongated flexible tether strings each having a reel end and a coupling end, said first tether string having the reel end thereof coupled with the first robot reel and the coupling end thereof secured to the body of said second robot, said second tether string having the reel end thereof coupled with said second robot reel and the coupling end thereof secured to the body of the first robot.

13. The robotic assembly of claim 1, said traction elements being pivotally secured to said body for independent pivoting movement thereof relative to the body.

14. The robotic assembly of claim 1, said mobile robot including sealing structure for permitting operation thereof under water.

15. A mobile robot comprising:

a body;

a pair of spaced apart, shiftable traction elements adapted to engage a surface over which a robot is to traverse;

means pivotally mounting said traction elements to said body for independent pivoting movement thereof relative to the body;

means for independent shifting movement of said of the traction elements respectively;

a carriage pivotally coupled to said body for pivoting thereof independently of the pivoting of said traction elements; and an operating unit supported on said carriage for carrying out a desired operation on or adjacent said surface.

16. The robot of claim 15, including a control assembly having means for controlling the independent shifting movement of each of said traction elements.

17. The robot of claim 16, said operating unit comprising an imaging device, said control assembly including structure for receiving imaging signals from said device.

18. The robot of claim 15, said traction elements comprising rotatable wheels, there being a separate drive motor operatively coupled to each of said wheels.

19. The robot of claim 15, said carriage being pivot about an axis transverse to the pivot axes of said traction elements.

20. The robot of claim 15, including a rotatable tether string reel supported by said body, and motive means for selective rotation of said reel.

21. A method of performing an operation on or adjacent a surface of an elongated member, said method comprising the steps of:

placing at least one mobile robot in engagement with a surface region of said elongated member, said mobile robot including a body equipped with a pair of spaced apart, shiftable, surface-engaging traction elements;

holding said mobile robot in tractive engagement with said surface region by a tether assembly operatively coupled with the mobile robot; and selectively and individually shifting the traction elements of said mobile robot and simultaneously adjusting the tension of said tether assembly for causing said robot to traverse said surface region.

22. The method of claim 21, said robot supporting an operating unit, said operating unit comprising an imaging device, said operating step comprising the step of generating an image of said surface areas or body during said traversal of said surface region.

23. The method of claim 21, said member being upright.

24. The method of claim 21, said member being a bridge-supporting column or pier.

25. The method of claim 21, there being at least a pair of said robots in engagement with spaced surface regions of said elongated member, each of said mobile robots including selectively and individually shiftable traction elements, said method comprising the step of selectively and individually shifting said traction elements of each robot.

26. The method of claim 21, said surface region of said elongated member being underwater.

\* \* \* \* \*